United States Patent [19]
Halsey

[11] 4,141,443
[45] * Feb. 27, 1979

[54] CONVEYOR SYSTEM FOR DELIVERING ARTICLES IN SUCCESSION

[75] Inventor: Arthur E. Halsey, Horsham, England

[73] Assignee: Vacuumatic Limited, Harwichm, England

[*] Notice: The portion of the term of this patent subsequent to Aug. 29, 1995, has been disclaimed.

[21] Appl. No.: 707,688

[22] Filed: Jul. 21, 1976

[30] Foreign Application Priority Data

Jul. 30, 1975 [GB] United Kingdom ............... 31860/75

[51] Int. Cl.² ............................................ B65G 47/74
[52] U.S. Cl. ..................................... 198/471; 198/483
[58] Field of Search ............... 198/459, 460, 461, 466, 198/471, 594, 718, 719, 812, 483, 484

[56] References Cited

U.S. PATENT DOCUMENTS

| | | | |
|---|---|---|---|
| 3,150,761 | 9/1964 | Pinault et al. | 198/812 |
| 3,460,667 | 8/1969 | Lanham | 198/812 |
| 3,556,280 | 1/1971 | Schnee et al. | 198/812 |
| 3,842,963 | 10/1974 | Kemper | 198/812 |

Primary Examiner—Robert B. Reeves
Assistant Examiner—Jeffrey V. Nase
Attorney, Agent, or Firm—Mawhinney & Mawhinney & Connors

[57] ABSTRACT

A conveyor system for delivering articles in succession has an endless conveyor loop, which is guided by guide rollers around a closed path including a horizontally extending run. The guide roller at one end of the horizontally extending run of the closed path and a further guide roller in a part of the path other than the horizontally extending run are mounted on a support, which is pivoted by a reciprocating mechanism so as to cyclically extend and retract the horizontal run of the loop at one of its ends while maintaining tension in the loop.

6 Claims, 2 Drawing Figures

CONVEYOR SYSTEM FOR DELIVERING ARTICLES IN SUCCESSION

This invention relates to conveyor systems.

According to the present invention there is provided a first conveyor system for delivering articles in a succession comprising an endless conveyor loop, means to guide the loop in a closed path including a horizontally extending run and means for cyclically extending and retracting the horizontal run of the loop at one end thereof.

The first conveyor system is located at the end of a further conveyor system having a horizontally extending article support surface located generally in alignment with the horizontal run of the first conveyor system, the further conveyor system including spaced article displacement elements which sweep over the support surface to displace articles along the surface, the first conveyor system being located adjacent said one end of the further conveyor system and the cyclically operating means for extending and retracting said end of the first conveyor system being timed in relation to the further conveyor system to retract the end of the first conveyor system to permit an article displacement member on the further conveyor system to pass through space between the retracted and extended positions of the first conveyor system and then to extend until the next article displacement member approaches.

Preferably means are provided for extending a further part of the conveyor loop of the first conveyor system as said end of the conveyor system is retracted and vice versa.

More specifically the guide means for the conveyor loop of the first conveyor may comprise a first movable guide located at said one end of the horizontal run around which the conveyor loop extends, two stationary guides over which the loop passes in said further part of its path and a second movable guide engaging the loop between the stationary guides and movable transverse to a line joining the stationary guides and means for supporting and moving the two movable guides to vary the extension of the horizontal run of the conveyor loop and, in compensation the length of the conveyor loop between the stationary guides.

The means to mount and move the two movable guides may comprise a pivotally mounted support and means to reciprocate the support.

A specific embodiment of the invention will now be described with reference to the accompanying drawings in which.

Figure 1:
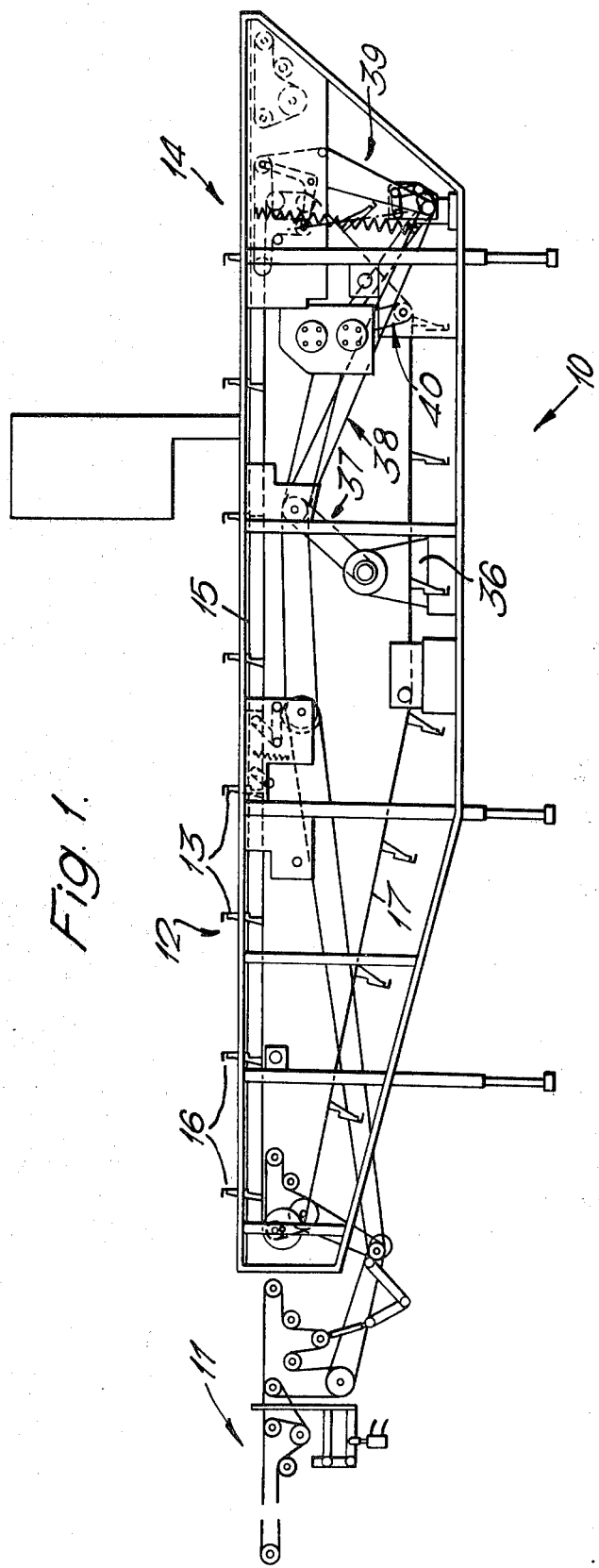
FIG. 1 is an elevation of a weighing apparatus with its drive system shown in semi-diagrammatic form.

FIG. 1 shows a weighing apparatus of the type described in copending United States Patent Application Ser. No. 707,398, abandoned, corresponding to United Kingdom Patent Application No. 31674/75, having an infeed system as described in copending United States Patent Application Ser. No. 707,389, now U.S. Pat. No. 4,109,780, corresponding to United Kingdom Patent Application No. 32096/75.

The weighing apparatus generally indicated at 10, includes a conveyor infeed system generally indicated at 11, a paddle conveyor system generally indicated at 12 having paddles 13 and an outfeed conveyor system in the form of a reciprocating system, generally indicated at 14.

Figure 2:
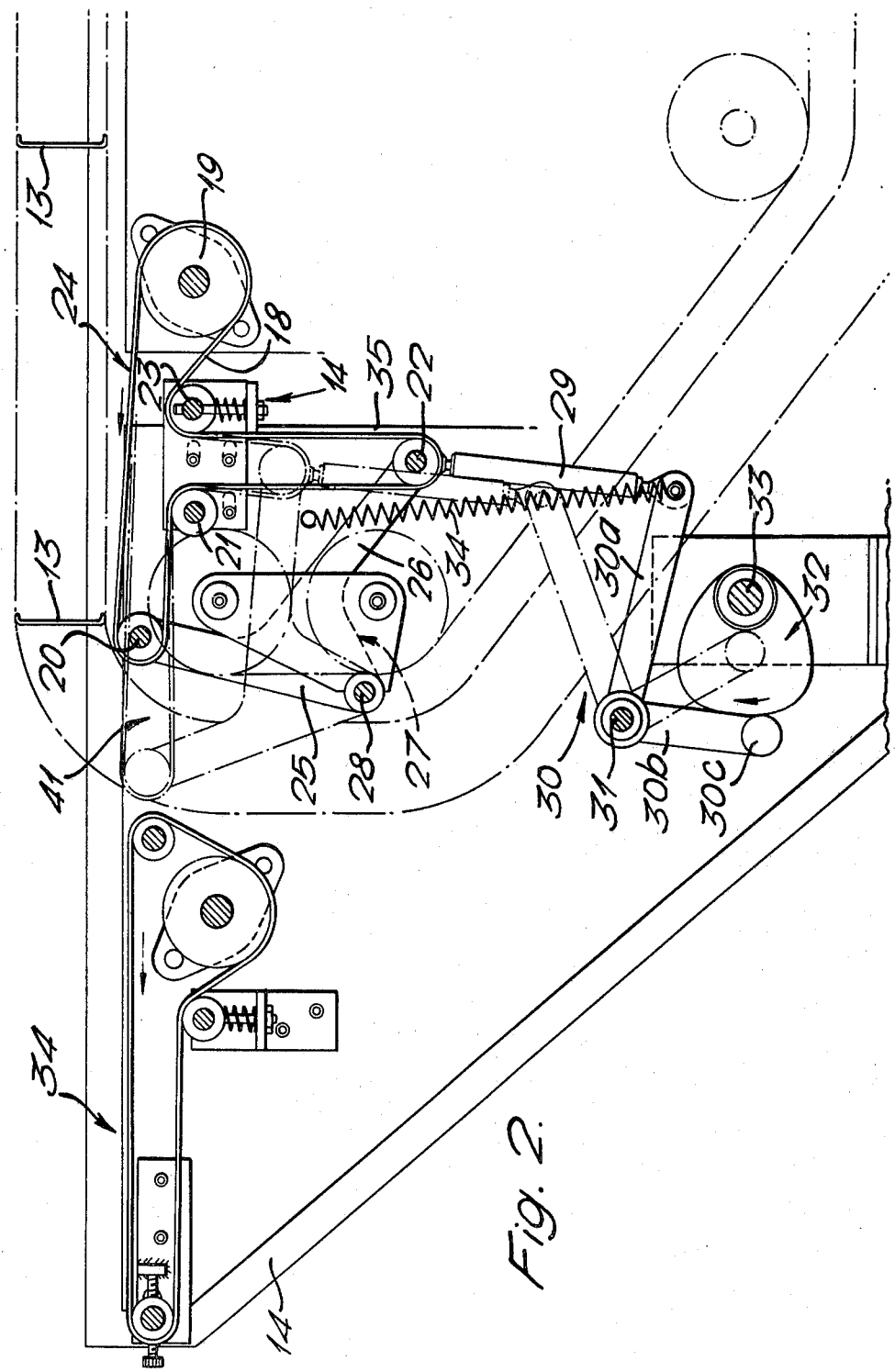
FIG. 2 is an enlarged view on a different scale of the downstream end of the apparatus of FIG. 1.

The paddle conveyor system, only paddles of which are shown in FIG. 2, is of the type having a generally horizontal conveyor bed 15, over which spaced paddles 13 run. Each pair of paddles 13 forming an article receiving space 16 or pocket and each article in a respective pocket being slid along the conveyor bed by the trailing paddle. At the downstream end of the conveyor, the paddles, which are mounted between continuous chains, one, of which is indicated at 17, disposed either side of the conveyor bed 15 have to pass through the level of the conveyor bed 15. At the same time the articles being moved by the paddles must be removed from the conveyor bed. The removal of the article is achieved by reciprocating conveyor means 14.

The reciprocating conveyor system 14 includes an endless belt 18 which is mounted around a driven pulley 19, a movable roller 20, stationary roller 21, a further movable roller 22 and a further stationary roller 23 to form the article support surface 24 between pulley 19 and movable roller 20.

The movable rollers 20 and 22 are mounted on the ends of respective arms 25 and 26 of a rocker member 27, which is pivotally mounted by pivot 28. A connecting link 29, the length of which is adjustable, is connected between arm 25 and end of a cam follower 30 comprising levers 30a and 30b and roller 30c which are pivotably mounted by pivot 31 to cooperate with rotary cam 32, which is mounted off a shaft 33. The cam follower 30 is biased towards its dotted line position by a spring 34.

In operation the cam follower 30 is lifted by the rotary cam 32 during one part of its cycle. The cam follower 30 in turn lifts the connecting link 29, which cause the rocker 27 to pivot, until the cam follower 30, link 29, and rocker 27 all reach the positions shown in dotted lines in the drawing.

During this movement the roller 20 is moved towards the upstream end of conveyor 34 which is disposed downstream of the conveyor system. The movement of the roller 20 extends the length of that part of the endless belt 18 forming the article support surface 24. The extra length of belt in this section of the conveyor system is provided from loop 35, which becomes shorter when the roller 22 is lifted to its upper position.

The cam follower 30 is then lowered by the rotary cam 32 and the rollers 20 and 22 return to their original positions, the extra length of belt resulting from the shortening of the article support surface 24 being taken up in loop 35 by the downward movement of roller 22.

The shaft 33, and hence the rotary cams 32, is driven by the motor 36 by means of drives 37 and 38 (see FIG. 1). The pulley 19 is driven from the shaft 33 by drive 39. The motor 36 also drives the chain 17 by means of drives 37, 38 and 40, hence the rotation of rotary cam 32 is controlled such that as a paddle 13 approaches the position of the leading paddle 13 in FIG. 2 the reciprocating conveyor 14 is in its solid line or retracted position and receives the article contained between the paddles 13 on its article supporting surface 24.

As the leading paddle passes through the gap 41 the roller 20 begins to move towards conveyor 34. When the roller 20 reaches its fully extended position the article is transferred onto the conveyor 34, which is itself driven from the shaft 33 by drive means (not shown). Preferably the conveyor 34 is driven at a faster speed than the belt 18 so that the article is accelerated away from the support surface 24.

The roller 20 then returns to its original position in time to form the gap 41 for the next paddle to pass through.

I claim:

1. A conveying apparatus comprising:

a first conveyor system having a stationary horizontally extending article support surface, article displacement elements, means for mounting the article displacement elements at spaced locations around an endless path, part of which extends along the article support surface, and means for driving the article displacement elements around the closed path to sweep over the article support surface to displace articles along the article support surface; and, a second conveyor system comprising an endless conveyor loop, means for guiding the loop around a closed path, including a horizontally extending run, means for driving the endless loop about the closed path, and means for cyclically extending and retracting the horizontal run of the closed path at one end thereof into and out of an article discharge position, the second conveyor system being located adjacent the downstream end of the first conveyor system with the horizontally extending article surface thereof in general alignment with the horizontally extending run of the second conveyor system, a third conveyor system wherein the downstream end of the horizontally extending run of the second conveyor system and the upstream end of the third conveyor system define a space in a common plane when the horizontally extending run of the second conveyor system is in its retracted position; and means for coupling the cylically operating means in timed relation with the drive means of the first conveyor system whereby the one end of the second conveyor system is retracted to admit an article displacement element on the first conveyor system to pass through the space and then to extend across the space until the next article displacement element approaches the common plane.

2. A conveying apparatus as claimed in claim 1, wherein the second conveyor system further comprises means for extending a further part of the path of the second conveyor system as the horizontal run of the path is retracted and vice versa.

3. Conveying apparatus as claimed in claim 2, wherein said cyclically operating means further comprises first and second movable guides, single means for supporting the first and second movable guides, means for pivotably mounting the support means and means for reciprocating the support means.

4. A conveying apparatus comprising:

a first conveyor system having a stationary horizontally extending article support surface, article displacement elements, means for mounting the article displacement elements at spaced locations around an endless path, part of which extends along the article support surface, and means for driving the article displacement elements around the closed path to sweep over the support surface to displace articles along the surface; a second conveyor system comprising an endless conveyor loop, means for guiding the loop around a closed path, including a horizontally extending run, means for driving the endless loop about the closed path, and means for cyclically extending and retracting the horizontally extending run of the closed path at one end thereof into and out of an article discharge position, the second conveyor system being located adjacent the downstream end of the first conveyor system with the horizontally extending article surface generally in line with the horizontally extending run of the second conveyor system;

a third conveyor system comprising an endless conveyor loop and means for driving the endless loop around the closed path including a horizontally extending run, the third conveyor system being located adjacent the downstream end of the second conveyor system with their respective horizontally extending portions in general alignment so that the downstream end of the horizontally extending run of the second conveyor system and the upstream end of the horizontally extending run of the third conveyor system define a space in a common plane when the horizontal run of the second conveyor system is in its retracted position; and, means for coupling the cyclically operating means in timed relation with the drive means of the first conveyor system whereby the one end of the second conveyor system is retracted to permit an article displacement element on the first conveyor system to pass through the space and then to extend until the next article displacement element approaches the common plane.

5. Conveying apparatus as claimed in claim 4 wherein said cyclically operating means further comprise first and second movable guides, single means for supporting the first and second movable guides, means for pivotably mounting the support means and means for reciprocating the support means.

6. A conveying apparatus as claimed in claim 5 wherein the guide means for the track of the second conveyor system further includes two stationary guides over which the loop passes in said further part of its path, when the means for extending and retracting the horizontally extending run of the path of the second conveyor system includes the first movable guide vacated at one end of the horizontally extended run around which the loop extends and said means for extending the further part of the path of the second conveyor system includes the second movable guide engaging the loop between the stationary guides and movable transverse to a line joining the stationary guides.

* * * * *